United States Patent

Lange et al.

[11] Patent Number: 5,992,345
[45] Date of Patent: Nov. 30, 1999

[54] PROCESS AND DEVICE FOR PRODUCING SAUSAGE SKINS AND SAUSAGE SKIN PRODUCED THEREBY

[76] Inventors: Johannes Lange, Rotdornweg 15, 25451 Quickborn; Joachim Peters, Am Schlosspark 22, 25524 Heiligenstedten, both of Germany

[21] Appl. No.: 08/860,855

[22] PCT Filed: Dec. 29, 1995

[86] PCT No.: PCT/EP95/05170

§ 371 Date: Sep. 12, 1997

§ 102(e) Date: Sep. 12, 1997

[87] PCT Pub. No.: WO96/21359

PCT Pub. Date: Jul. 18, 1996

[30] Foreign Application Priority Data

Jan. 10, 1995 [DE] Germany .......................... 195 00 470

[51] Int. Cl.[6] .............................. A01J 27/02; B05C 5/00; B05B 13/06; A23G 1/00
[52] U.S. Cl. ............................... 118/13; 118/24; 118/317; 427/181; 427/183; 427/202; 427/237; 426/105; 426/135
[58] Field of Search ............................ 99/441; 206/802; 426/105, 135, 420, 415; 118/13, 24, 306, 317, 318; 156/293; 452/21, 23, 25, 27; 427/181, 182, 183, 202, 237

[56] References Cited

U.S. PATENT DOCUMENTS

| 4,343,436 | 8/1982 | Lehmann | 239/696 |
|---|---|---|---|
| 4,374,871 | 2/1983 | Steinbis | 427/236 |
| 4,377,127 | 3/1983 | Tinchon | 118/306 |
| 5,173,325 | 12/1992 | Knobbe et al. | 427/476 |
| 5,705,214 | 1/1998 | Ito et al. | 426/135 |

FOREIGN PATENT DOCUMENTS

| 408164 A2 | 1/1991 | European Pat. Off. | A23P 1/08 |
|---|---|---|---|
| 408164 A3 | 1/1991 | European Pat. Off. | A23P 1/08 |
| 408164 B1 | 1/1991 | European Pat. Off. | A23P 1/08 |
| 0 408 164 B1 | 6/1994 | European Pat. Off. | A23P 1/08 |
| 970 263 | 9/1958 | Germany . | |
| 140 196 | 2/1980 | Germany | A22C 13/00 |
| 41 23 745 A1 | 1/1993 | Germany | A22C 13/00 |
| 95/24835 | 9/1995 | WIPO | A23L 1/31 |

OTHER PUBLICATIONS

Database WPI, Section Ch, Week 7550, Derwent Publications Ltd., London, GB; Class A92, AN 74–82543V & JP 49 075 746; Jul. 22, 1974.

Database WPI, Section Ch, Week 7730, Derwent Publications, Ltd., London, GB; Class A97, AN 77–52921 & JP A 52 070 039; Jun. 10, 1977.

Database WPI, Section Ch, Week 9109, Derwent Publications Ltd., London, GB; Class D12, AN 91–061836 & JP A 03 010 660; Jan. 18, 1991.

*Primary Examiner*—Richard Crispino
*Assistant Examiner*—J. A. Lorengo
*Attorney, Agent, or Firm*—Alix, Yale & Ristas, LLP

[57] ABSTRACT

A process and a device for producing sausage casings which bear a coating of spice particles on the inside are distinguished in that the inside of the sausage casing is provided with an adhesive coating which hardens from the liquid state and the spice particles are projected against the adhesive coating while it remains adhesive. The production of the spice particle coating can be interrupted in sections, that is to say in the sections predetermined for tying off individual sausage casings.

8 Claims, 2 Drawing Sheets

PROCESS AND DEVICE FOR PRODUCING SAUSAGE SKINS AND SAUSAGE SKIN PRODUCED THEREBY

CROSS-REFERENCE TO RELATED APPLICATIONS

This is the national stage of International application No. PCT/EP95/05170 filed Dec. 29, 1995.

BACKGROUND OF THE INVENTION

It is known to provide sausage with a spice coating on the outside, for example pepper salami. For this purpose, the sausage is freed from the casing and, after coating with an adhesive liquid, is covered with the ground spice in an airstream (DE-A 31 35 493). Since this process is laborious, it has also been proposed to provide the sausage casing on the inside with an edible coating which contains the spices (DE-A 41 23 745, EP-B 408 164, DD-A-140 196, Chemical Abstracts JP 49075746, JP 3010660 Abstract, JP 52070039 Abstract). However, in this process the spice becomes part of a relatively thick binder layer containing the spice, which binder layer remains on the sausage after the casing has been removed. This impairs the appearance of the sausage in comparison with conventional products, for example pepper salami. It is also undesirable if the spicecontaining coating including spices is removed from the sausage together with the sausage casing. The production of the known spice-containing sausage casings is also relatively laborious.

EP-B-408 164 discloses providing the sausage casing on the inside with spice particles, by providing the inside with an adhesive layer and dusting the spice particles onto this adhesive layer. Only the treatment of planar casing material is disclosed, tubular material must be cut open in advance.

It is a further disadvantage that the casing material, when the sausage ends are tied off by means of a cord or wire clip, is subjected to great stress, which can lead to tearing of the same if a sharp spice fragment is situated on the inside at the tying-off point.

SUMMARY OF THE INVENTION

The object underlying the invention is to provide a device of the type mentioned which permits tubular sausage casings with an inner spice coating to be produced.

The device according to the invention provides that the spice particles are projected against an adhesive coating which has been applied to the inside of the sausage casing. The spice particles remain on, or partly in, the adhesive coating and are permanently joined by this means to the sausage casing, as soon as the adhesive layer has dried. The sausage casings produced in this manner can be processed conventionally.

The device according to the invention has the advantage that it succeeds with only slight modification of known sausage casing manufacturing devices, for devices are known which are used to provide endless fabric tubings with a collagen coating on the inside which converts the fabric into a sealing skin. The internal collagen application can, while it is still sufficiently adhesive, be used to bind the spice particles to the sausage casing. For this purpose, downstream of the coating apparatus, there is provided an apparatus which projects the particles against the inside of the inflated sausage casing. This is performed, for example, by means of a thrower disc or a blast nozzle. The fabric tubing material can be run over the coating apparatus and thrower apparatus in a conventional manner. The adhesive coating is then allowed to harden. Generally this means that it is allowed to dry. However, it is not intended to exclude the fact that it can be hardened by other processes, for example chemical processes.

Expediently, the radial velocity for applying the spice particles to the sausage casing is imparted to the particles by a blast nozzle or thrower disc, by means of which a readily controllable application of the spice particles may be achieved.

According to the invention, the particle coating may be interrupted in the sections destined for tying off individual sausage casings. This prevents an excessive stressing of the casing material, which can lead to tearing of the same if a sharp spice fragment is situated on the inside at the tying-off point. In the process according to the invention, in the sections predetermined for tying off individual sausage casings, the particle feed is interrupted in sections during the covering of the inside of the sausage casings. Alternatively, it can be provided that the particles applied to the casing on the inside in the indicated sections are then removed again, if they have a size which would endanger the integrity of the sausage casing at the tying-off point; for example, large spice grains can be blown or brushed off. It can also be provided that the particle feed is interrupted in sections and, in addition, an operation follows which removes any spice particles which happen to remain adhering in these areas. The spice-free sections can also be produced by means of the fact that application of the adhesive is suspended in sections, so that the particles cannot remain behind. This measure can also be combined with the interruption of the particle feed and/or the subsequent removal of any particles which have nevertheless remained adhering.

The process is expediently carried out in such a manner that all or a considerable proportion (more than 30% by weight) of the particles are not incorporated entirely into the adhesive coating, but they each sink into it only to a small proportion (less than half their diameter) and are bound, so that they remain for the most part adhering on or in the sausage surface when the casing is removed from the ripened sausage. This is particularly important in those cases in which the adhesive coating is not intended to become a consumable part of the sausage. However, this shall not exclude the case that, as adhesive coating, use is made of substances (in particular edible proteins such as alginate) which may remain in whole or in part on the sausage when the sausage casing is removed.

Of course, to establish the sections in which the particle coating is interrupted, the length of the sausage casings must be established in advance. With modern control means, this may be achieved readily and in a variable manner.

Expediently, in the region in which the particles are applied, or in a region through which the sausage casing which is provided with the particles is then moved, a vigorous air movement is maintained, which detaches again those particles which were not sufficiently firmly bound. This decreases the risk that inadequately bound particles become detached later when it is undesired. In this context, pneumatic application of the particles is particularly expedient.

Although the vigorous air movement is accompanied by the fact that very fine-grained material becomes attached even in those sections in which no particles are actually intended to remain adhering, this is harmless, because it does not lead to the harmful stressing of the casing material mentioned on tying off.

It must be expected that some of the particles projected against the inside of the casing are not bound, but fall off. In order that they do not remain loose in the sausage casing, it is expedient to remove the treated sausage casing from the coating device from the top or from the bottom, an apparatus being provided to collect loose particles.

A semi-endless sausage casing which is produced according to the invention and which is formed from tubular fabric continuously, i.e. generally seamlessly, is distinguished according to the invention in that it bears a coating of spice particles on the inside, which coating is interrupted in sections, namely in those sections which are predetermined for tying off individual sausage casings.

BRIEF DESCRIPTION OF THE DRAWINGS

The invention is described below in more detail with reference to the drawing which illustrates advantageous working examples. In the drawing.

DETAILED DESCRIPTION OF THE INVENTION

Unless otherwise specified, the parts of the device shown are bodies of revolution.

Figure 1:
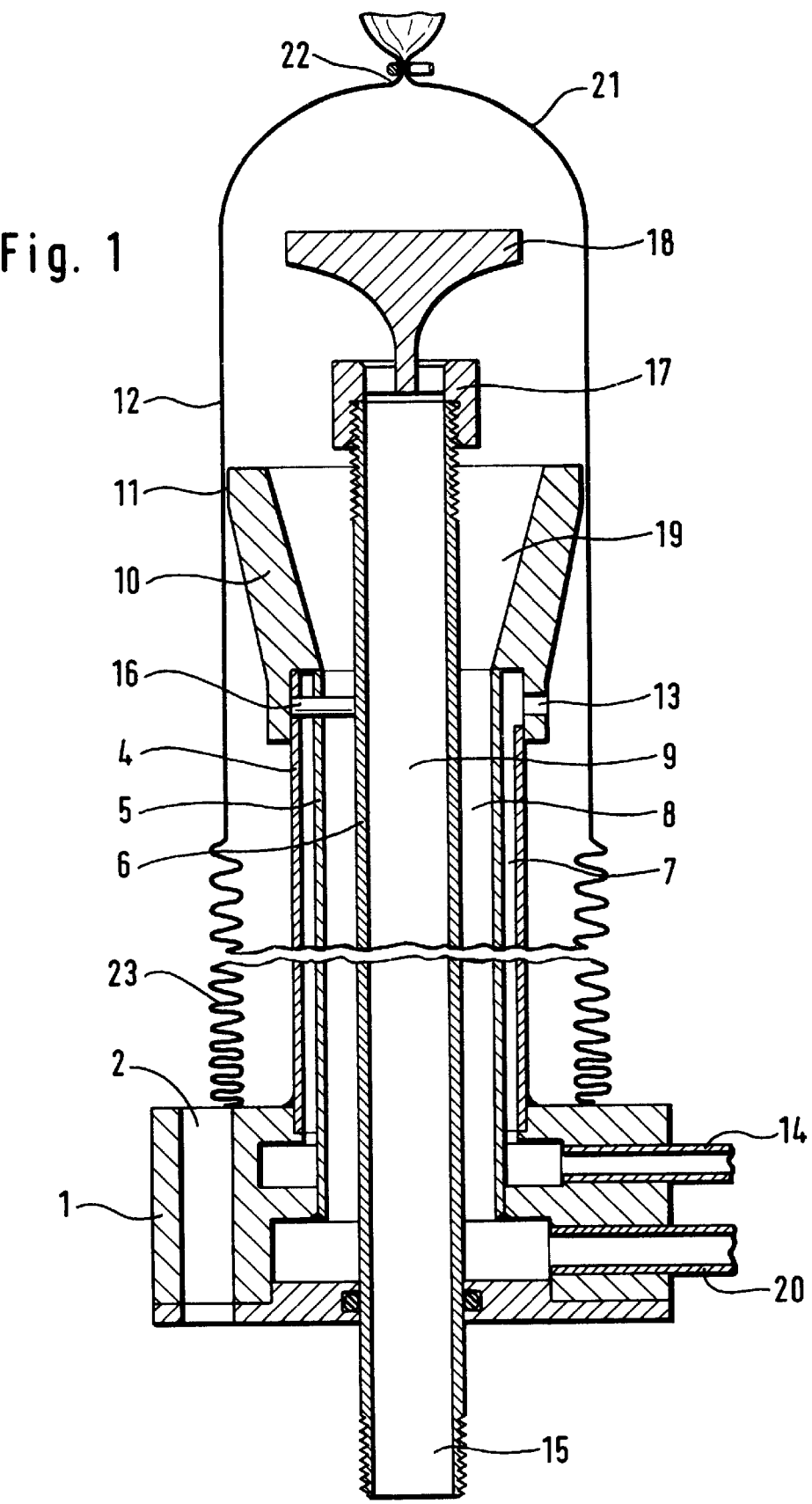
FIG. 1 shows a longitudinal section through a first embodiment.

According to FIG. 1, the base 1 of the device is fixed by means of bolts, which are not shown and which are run through bolt holes 2, to a holder which is not shown, in such a manner that its longitudinal axis is vertical. To the base are fixed three concentric tubes 4, 5 and 6, whose intermediate spaces and interiors 7, 8, 9 are sealed off from one another. The tubes 4, 5 bear at their top end a coating ring 10 whose larger outer circumference 11 is not significantly less than that of the sausage casing 12 to be treated and which has a plurality of outlet orifices 13 which are distributed around the circumference a little below and are connected to the intermediate space 7 between the tubes 4 and 5. This intermediate space 7 is connected in the base to a feed tube 14 which serves to feed a suitable adhesive.

The inner tube 6 is attached via its bottom open port 15 to a pneumatic conveying line for spice powder. Within the coating ring 10, the inner tube is centred by means of pins 16 distributed around the circumference and, at the end, it bears a deflector or nozzle formed by the ring parts 17, 18, by means of which deflector or nozzle the conveying stream containing the spice particles is deflected outwards on all sides. The coating ring 10 situated below the nozzle 17, 18 forms on the inside a receiving funnel 19 for descending particles, which funnel opens into the intermediate space 8 between the tubes 5 and 6, which is attached at the bottom to a suction port 20. Centrally above this device arranged with vertical axis is situated a take-off device which is known per se, by means of which a sausage casing 21 being treated, which is tightly sealed at its top end 22, is taken off at the top with an elastic force.

This device is used in the following manner. Below the coating ring 10 is mounted a sausage casing store 23 of, for example, textile sausage casing material. Its upper end is closed above the coating ring and nozzle 17, 18 at 22 and attached to the take-off apparatus. Through the tube 15 is fed compressed air which inflates the part of the sausage casing 12 situated above the coating ring 10. The adhesive, which is in liquid to pasty state, is fed to the inside of the sausage casing through the connection port 14, the intermediate space 7 between the tubes and the exit orifices 13, which adhesive is distributed by the coating ring 10 onto the inside of the sausage casing 12 and is in the desired thickness. Advancing with the coating process, the sausage casing is taken off at the top by means of the take-off apparatus, with it remaining inflated, in order, finally, to be dried in the inflated state, also.

Up to this point, device and process are to be considered as known.

The airstream fed through the tube 15 is simultaneously a conveying medium for the spice to be applied to the inside of the sausage casing 12, which spice is present in solid form, pulverulent or fine-grained, and can therefore be pneumatically conveyed by the air current. The deflector head 18 projects it radially outwards against the inside of the sausage casing, where it is for the most part caught and retained by the adhesive coating. In the subsequent drying process, the adhesion is consolidated. The excess of the air and particle stream is received by the funnel 19 and conducted away by the intermediate space 8 between the tubes and the port 20.

Figure 2:
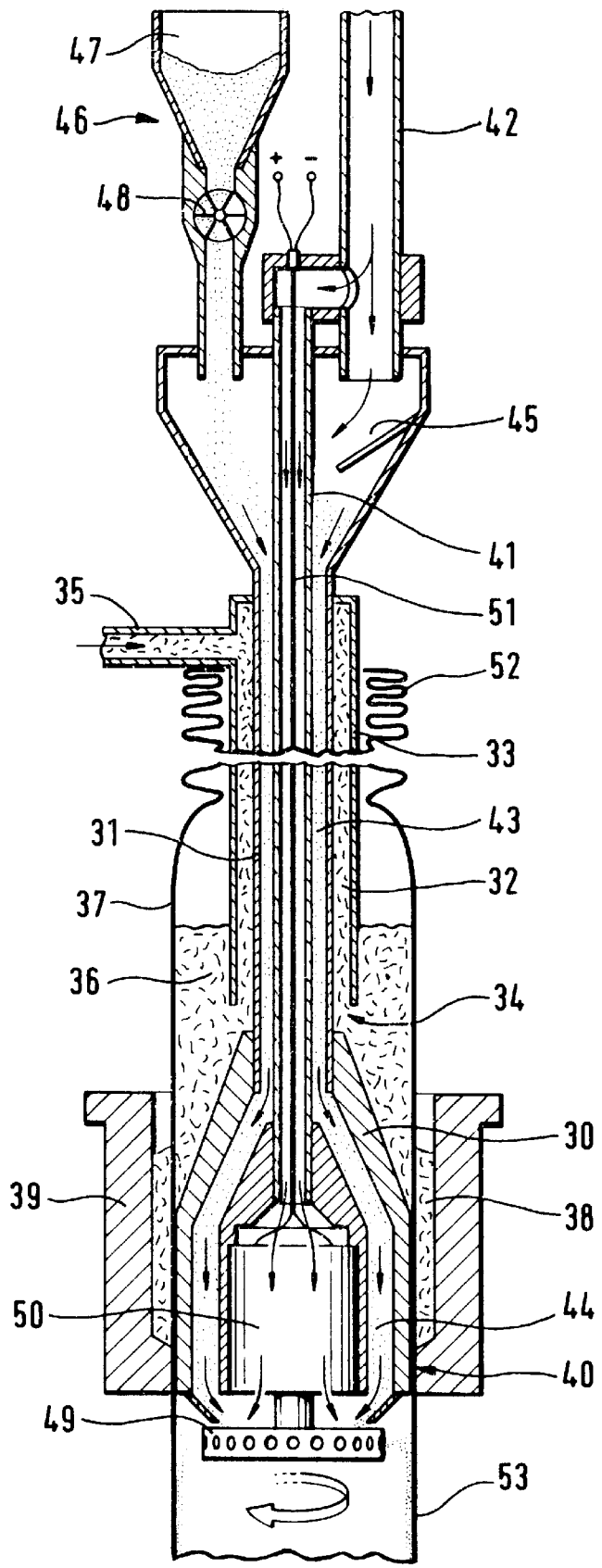
FIG. 2 shows a longitudinal section through a second embodiment.

In the design according to FIG. 2, a coating ring 30 is arranged suspended on a tube 31 which is surrounded by a tube 33, forming an intermediate space 32. The intermediate space 32 which is closed at the top and open to the coating ring 30 at the bottom at 34 is connected via a port 35 to a source of flowable coating medium. At 36, this fills the intermediate space between the sausage casing 37 and the coating ring 30 and the tubes 31, 33. The coating medium also in part penetrates the sausage casing material 37 to be coated and, at 38, fills the intermediate space between the sausage casing material 37 and the inside of an outer coating ring 39. The inner coating ring 30 and the outer coating ring 39 face each other at 40 with their largest and smallest diameters, respectively, in order to wipe off the coating material in the predetermined layer thickness from the inside and outside respectively of the sausage casing material 37. A tube 41 is arranged concentrically within the tube 31, which tube 41, at the top end, is attached to a tube 42 which is connected to a compressed-air source. The tube 41 opens within or below the inner coating ring 30 and by this means communicates the superatmospheric pressure to the interior of the coated sausage casing. The device is arranged with a vertical axis and the coated sausage casing is continuously taken off from it at the bottom during operation. For this purpose, a take-off apparatus which is not shown is provided, which engages the closed bottom end of the sausage casing 53, in accordance with the take-off apparatus explained with reference to FIG. 1. Since the coated sausage coating 53 is closed at the bottom end, it is inflated below the coating apparatus by the airstream exiting from the tube 41 and can be dried in this state.

Between the tubes 31 and 41 there is an intermediate space 43, which is continued in the region of the inner coating ring 30 by an annular space 44 open at the bottom. The intermediate space 43 is connected at the top to the previously mentioned compressed-air line 42. In addition it departs from the lower end of a funnel 45, to which the pulverulent or fine-grained spice is fed from a spice-feeding apparatus 46, which can comprise a metering feeder 48 and a storage vessel 47. Together with the airstream originating from the compressed-air tube 42, this spice passes into the intermediate space 43 between the tubes and exits at the bottom from the annular space 44. There it impacts on a thrower disc 49 having a multiplicity of radial outlet bore holes. The disc is driven by a motor 50, which is enclosed by the annular space 44 and attached to the tube 41 and is fed via leads 51. It is expediently a variable-speed direct current motor. It is cooled by the airstream exiting from the tube 41. The thrower disc expediently has a diameter from ½ to ¾ of the diameter of the sausage casing, in particular 3–6 cm, and is driven at a speed of 6000 to 20,000 rpm, in particular 12,000 to 16,000 rpm.

The coating apparatus can be provided with means, which are not shown, which facilitate the flow of coating medium, the sliding of the sausage casing and/or the wetting of the sausage casing by the coating medium, for example a heater, which improves the temperature and flowability of the coating medium, or a vibration apparatus.

The device is used in the following manner. The sausage casing material 37 is continuously taken off downwards from a store 52 with simultaneous feed of coating composition, and is coated. At the same time, the spice is projected by the thrower disc 49 onto the inside of coated sausage casing 53 and to a large extent remains on this. Loose excess spice can be taken off from the bottom end of the coated sausage casing.

In both working examples, the spice feed and/or adhesive feed can readily be interrupted in sections, in order to form those sausage casing sections which are to remain free of spice.

Example:

A tubular sausage casing of cotton fabric in linen weave having a weight of 129 g/m² was coated, as described above, using the device according to FIG. 1 with a binder, which was composed of 3.5% alginate, 4% glycerol and the remainder water. The dry weight of this coating was 80 g/m². The fresh wet coating was about 1600 g/m² and was covered with 380 g/m² of spice, namely coarsely crushed pepper. The dry weight of the product was 589 g/m² in the regions coated with spice.

Depending on the type, seasoning power and fineness of grinding of the spice, its application rate can be between a few g/m² and about 1000 g/m². The optimum coating rate can readily be determined by experiment—starting from the said example—for other spice quantities or binder compositions.

We claim:

1. Device for producing sausage casings which bear a coating of spice particles on the inside comprising means for inflating a sausage casing and internally coating the inflated casing with an adhesive which hardens from the liquid state and a particle dispenser for projecting spice particles against the inside of the sausage casing, said dispenser being positioned downstream of said coating means for applying the spice particles to the internally coated and inflated sausage casing.

2. Device according to claim 1, characterized in that the dispenser for projecting the particles comprises a thrower disc (49).

3. Device according to claim 1, characterized in that the dispenser for projecting the particles comprises a blast nozzle (17, 18).

4. Device according to claim 1, characterized in that the dispenser for projecting the particles can be shut off periodically.

5. Process for producing sausage casings which bear a coating of spice particles on the inside, comprising the steps of inflating a tubular casing, coating the inside of the casing with an adhesive coating which hardens from the liquid state and projecting spice particles against the adhesively coated inside of the inflated tubular casing, the particle feed or the adhesive coating operation being interrupted in sections of the casing predetermined for tying off individual lengths of casing.

6. Process according to claim 5, characterized in that a substantial proportion of the particles are incorporated into the adhesive coating by the lesser part of their thickness.

7. Process according to claim 5, characterized in that a substantial proportion of the particles are incorporated into the adhesive coating by parts of their thickness so low that they remain adhering on or in the sausage surface when the casing is removed from the ripened sausage.

8. Process according to claims 5, characterized in that the adhesive coating is formed from a substance participating in the formation of the sausage casing.

\* \* \* \* \*